United States Patent
Kumar et al.

(10) Patent No.: US 12,490,222 B2
(45) Date of Patent: Dec. 2, 2025

(54) ENHANCING POSITIONING EFFICIENCY

(71) Applicant: NOKIA TECHNOLOGIES OY, Espoo (FI)

(72) Inventors: Dileep Kumar, Oulu (FI); Italo Atzeni, Oulu (FI); Carlos Morais De Lima, Oulu (FI); Antti Tölli, Oulu (FI); Juha Pekka Karjalainen, Oulu (FI); Sami-Jukka Hakola, Kempele (FI); Timo Koskela, Oulu (FI); Jari Yrjänä Hulkkonen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 369 days.

(21) Appl. No.: 18/013,132

(22) PCT Filed: Jul. 1, 2020

(86) PCT No.: PCT/EP2020/068521
§ 371 (c)(1),
(2) Date: Dec. 27, 2022

(87) PCT Pub. No.: WO2022/002387
PCT Pub. Date: Jan. 6, 2022

(65) Prior Publication Data
US 2023/0239829 A1 Jul. 27, 2023

(51) Int. Cl.
*H04W 64/00* (2009.01)
*H04W 24/10* (2009.01)

(52) U.S. Cl.
CPC ............ *H04W 64/00* (2013.01); *H04W 24/10* (2013.01)

(58) Field of Classification Search
CPC ....... H04W 4/02; H04W 4/029; H04W 4/023; H04W 64/00; H04W 4/80; H04W 24/10; H04M 2242/30
See application file for complete search history.

(56) References Cited

U.S. PATENT DOCUMENTS

2010/0130229 A1* 5/2010 Sridhara ............ G01S 5/10
340/686.1
2014/0274131 A1* 9/2014 Zhang ............ G01S 5/0018
455/456.2

FOREIGN PATENT DOCUMENTS

CN 101925178 B * 11/2012
CN 105284166 A * 1/2016 ......... H04L 67/1061
(Continued)

OTHER PUBLICATIONS

International Search Report and Written Opinion dated Mar. 23, 2021 corresponding to International Patent Application No. PCT/EP2020/068521.

*Primary Examiner* — Umair Ahsan
(74) *Attorney, Agent, or Firm* — Barta Jones, PLLC

(57) ABSTRACT

There is provided a method for a user equipment, UE, of a wireless communication network, the method comprising: obtaining a first measurement data associated with a determined position of the UE and second measurement data, the first and second measurement data obtained by performing measurements by the UE; obtaining a difference value indicative of a difference between at least one measurement value of the first measurement data and at least one measurement value of the second measurement data; comparing the difference value with at least one repositioning threshold value provided by the wireless communication network to the UE; and if the difference value exceeds the at least one repositioning threshold value, triggering a transmission of a repositioning request to a network node of the wireless communication network.

4 Claims, 8 Drawing Sheets

(56) References Cited

FOREIGN PATENT DOCUMENTS

| WO | 2013/029143 A1 | 3/2013 |
| WO | 2019/175463 A1 | 9/2019 |
| WO | 2020/028517 A1 | 2/2020 |

* cited by examiner

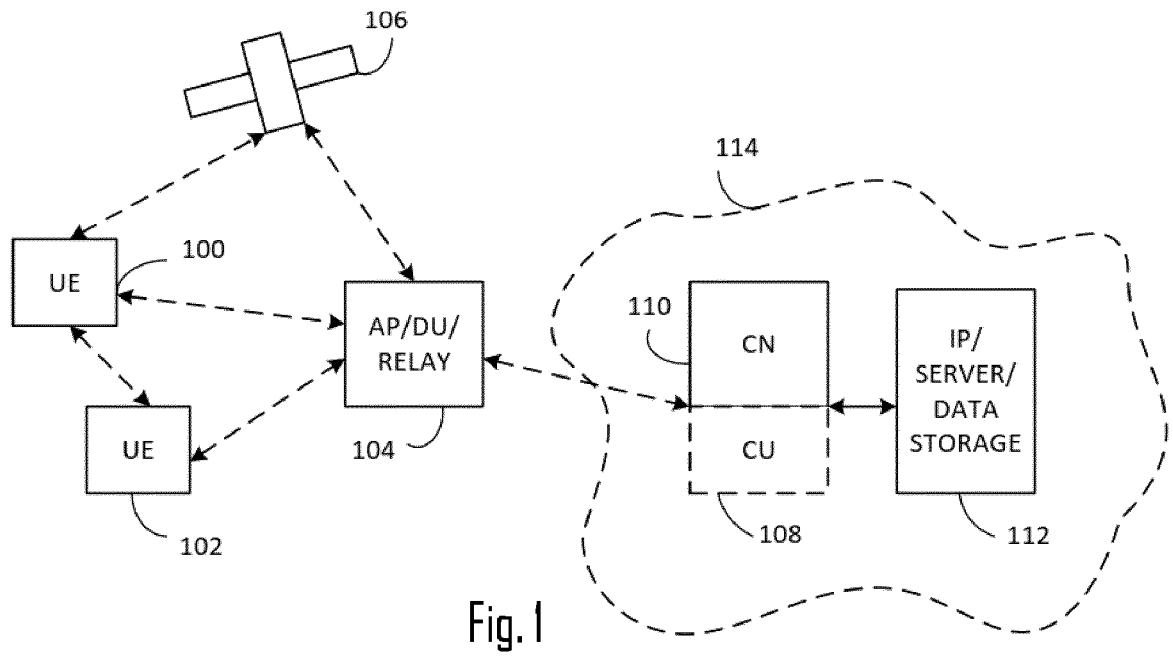

Fig. 1

202: OBTAINING FIRST MEASUREMENT DATA ASSOCIATED WITH DETERMINED POSITION AND SECOND MEASUREMENT DATA

204: OBTAINING DIFFERENCE VALUE INDICATIVE OF DIFFERENCE BETWEEN VALUE (S) OF THE FIRST MEASUREMENT DATA AND VALUE(S) OF SECOND MEASUREMENT DATA

206: COMPARING DIFFERENCE VALUE WITH REPOSITIONING THRESHOLD VALUE

208: TRIGGERING TRANSMISISON OF REPOSITIONING REQUEST IF DIFFERENCE VALUE EXCEEDS THERESHOLD VALUE

Fig. 2

302: DETERMINING POSITION OF UE, FIRST MEASUREMENT DATA BEING ASSOCIATED WITH THE DETERMINED POSITION

304: CONFIGURING UE TO PEFORM MEASUREMENT(S) TO OBTAIN SECOND MEASUREMENT DATA OR OBTAINING SAID DATA BASED ON VIRTUAL D2D COMMUNICATION LINK BETWEEN UE AND ANOTHER UE

306: PERFORMING REPOSITIONING PROCEDURE ON THE UE IF DIFFERENCE VALUE BETWEEN MEASUREMENT VALUE OF FIRST MEASUREMENT DATA AND MEAUSUREMENT VALUE OF SECOND MEAUSUREMENT DATA EXCEEDS REPOSITIONING THRESHOLD

Fig. 3

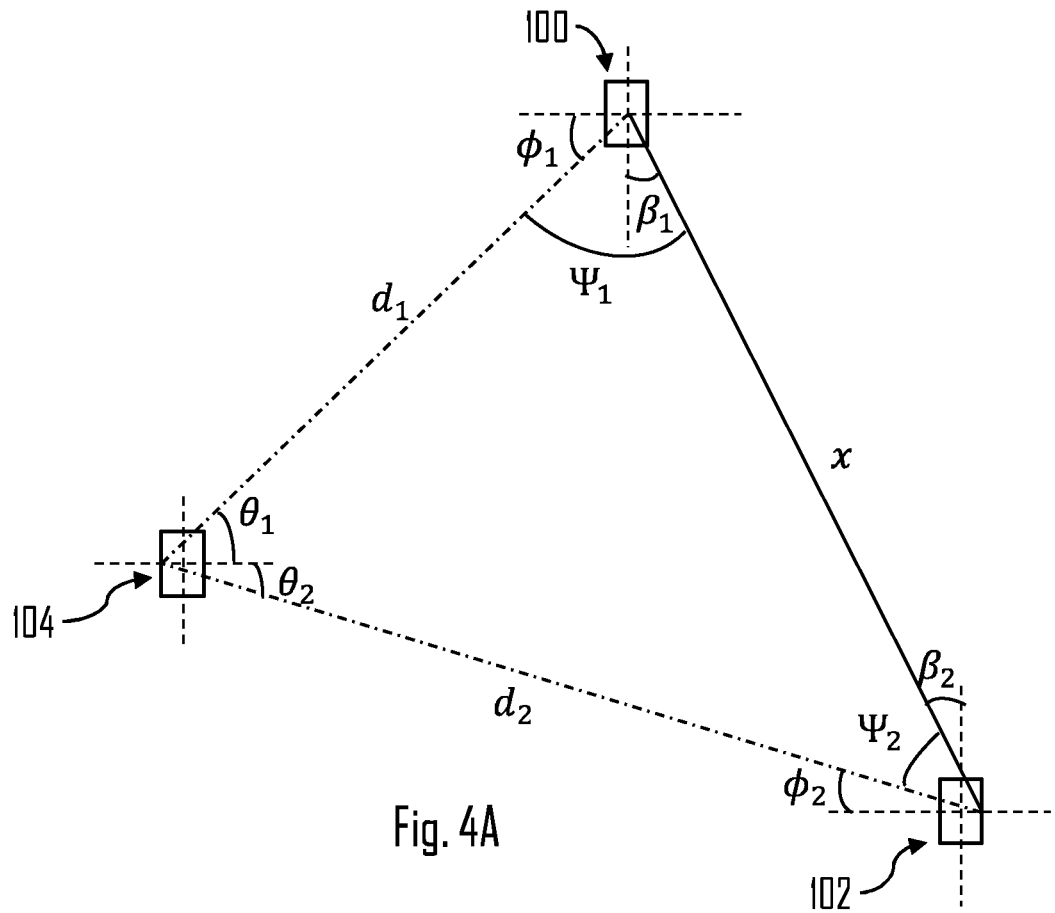

Fig. 4A

ENHANCING POSITIONING EFFICIENCY

TECHNICAL FIELD

The invention relates to communications.

BACKGROUND

Modern wireless communication networks provide support for different positioning technologies to meet regulatory and commercial requirements and use cases. Therefore, there seems to be a growing need to develop solutions targeted to enhancing UE positioning processes and procedures.

BRIEF DESCRIPTION

According to an aspect, there is provided the subject matter of the independent claims. Some embodiments are defined in the dependent claims.

The embodiments that do not fall under the scope of the claims are to be interpreted as examples useful for understanding the disclosure.

One or more examples of implementations are set forth in more detail in the accompanying drawings and the description below. Other features will be apparent from the description and drawings, and from the claims.

BRIEF DESCRIPTION OF DRAWINGS

In the following some embodiments will be described with reference to the attached drawings, in which FIG. 1 illustrates an example of a wireless communication system to which embodiments may be applied;

FIGS. 2 and 3 illustrate flow diagrams according to some embodiments;

FIGS. 4A, 4B, and 4C illustrate some embodiments;

DETAILED DESCRIPTION OF SOME EMBODIMENTS

Figure 4B:
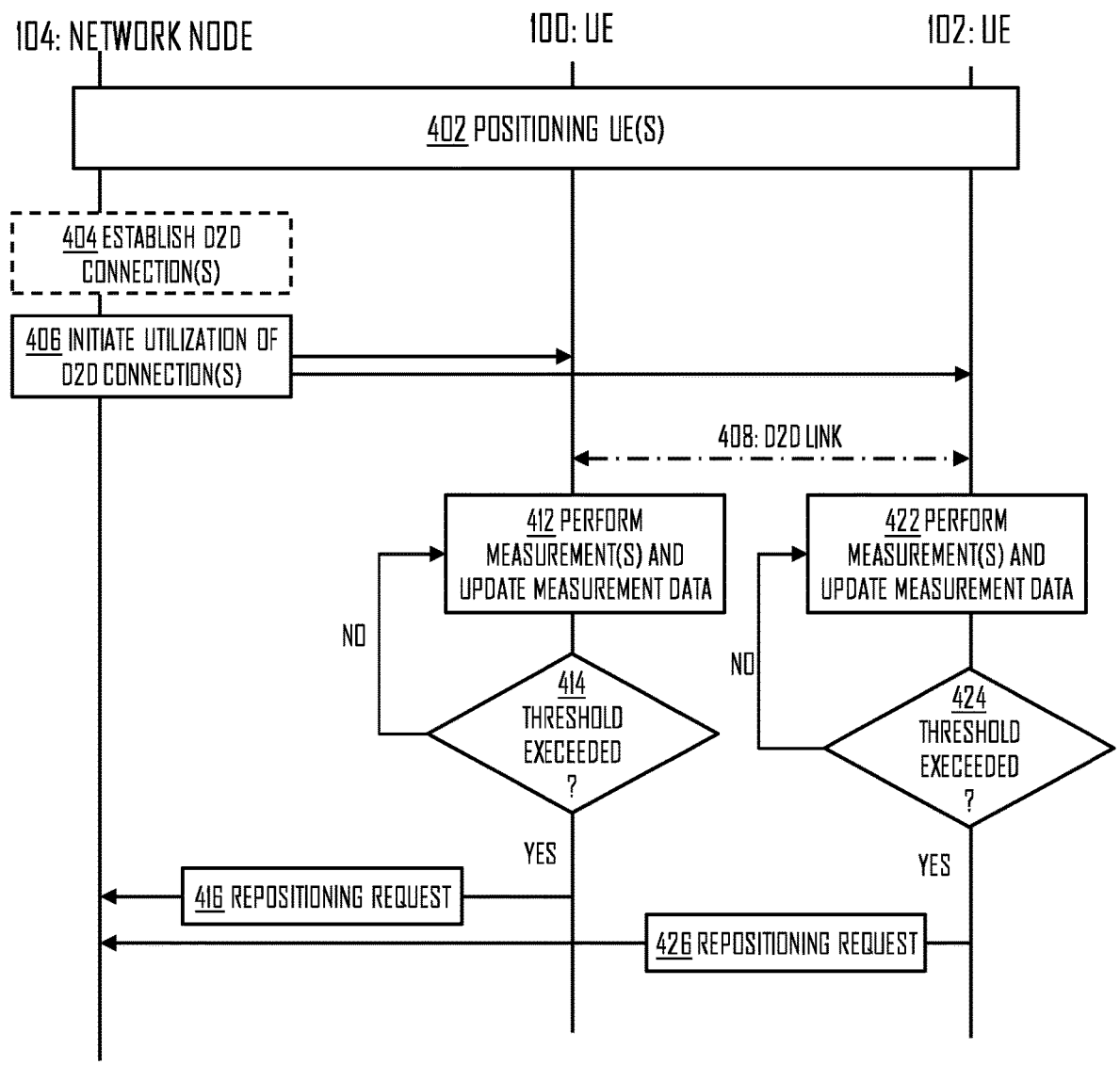

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network. FIG. 1 shows terminal devices or user devices 100 and 102 configured to be in a wireless connection on one or more communication channels in a cell with an access node (such as (e/g) NodeB) 104 providing the cell. (e/g) NodeB refers to an eNodeB or a gNodeB, as defined in 3GPP specifications. The physical link from a user device to a (e/g) NodeB is called uplink or reverse link and the physical link from the (e/g) NodeB to the user device is called downlink or forward link. It should be appreciated that (e/g) NodeBs or their functionalities may be implemented by using any node, host, server or access point etc. entity suitable for such a usage.

A communications system typically comprises more than one (e/g) NodeB in which case the (e/g) NodeBs may also be configured to communicate with one another over links, wired or wireless, designed for the purpose. These links may be used not only for signalling purposes but also for routing data from one (e/g) NodeB to another. The (e/g) NodeB is a computing device configured to control the radio resources of communication system it is coupled to. The NodeB may also be referred to as a base station, an access point, an access node, or any other type of interfacing device including a relay station capable of operating in a wireless environment. The (e/g) NodeB includes or is coupled to transceivers. From the transceivers of the (e/g) NodeB, a connection is provided to an antenna unit that establishes bi-directional radio links to user devices. The antenna unit may comprise a plurality of antennas or antenna elements. The (e/g) NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobility management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network, such as Industrial IoT (IIoT) network, which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses. User device herein may also refer to vehicular implementations, such as vehicle UEs. Such UEs may be comprised and/or communicatively coupled with vehicle such that they may be understood as part of the vehicle or vehicles.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control). 5G is expected to have multiple radio interfaces, namely below 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and typically fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilize geostationary earth orbit (GEO) satellite systems, but also low earth orbit (LEO) satellite systems, in particular mega-constellations (systems in which hundreds of (nano) satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g) NodeBs, the user device may have an access to a plurality of radio cells and the system may comprise also other apparatuses, such as physical layer relay nodes or other network elements, etc. At least one of the (e/g) NodeBs or may be a Home (e/g) nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g) NodeBs has been introduced. Typically, a network which is able to use "plug-and-play" (e/g) Node Bs, includes, in addition to Home (e/g) NodeBs (H (e/g) nodeBs), a home node B gateway, or HNB-GW (not shown in FIG. 1). A HNB Gateway (HNB-GW), which is typically installed within an operator's network may aggregate traffic from a large number of HNBs back to a core network. The network discussed herein may refer to, for example, cellular network such as 5G and the like.

As shown in FIG. 1, the UEs 100, 102 (and/or any other UE of the described system) may support device-to-device (D2D) communication. D2D communication may sometimes be referred to as sidelink communication. Hence, D2D communication may be understood also as sidelink communication in which two UEs communicate, for example, directly with each other. So, even though reference is made to D2D communication it may similarly comprise sidelink communication.

NR provides support for different positioning technologies to enable regulatory as well as commercial use cases aiming at high-accuracy positioning for various verticals, while supporting the corresponding requirements. To achieve the aforementioned high-accuracy positioning requirements demanded by the new applications and industry verticals, NR positioning procedure may aim to meet the following illustrative performance targets:

(1) For general commercial use cases:
   sub-meter level position accuracy, i.e. <1 meters.
(2) For IIoT use cases:
   position accuracy <0.2 meters.

Regarding the target latency, the requirement for the IIoT use cases may be <100 milliseconds (ms), while some specific deployment scenarios may require latency in the order of 10 ms, or the like.

In current cellular systems, e.g., LTE, the localization of a target UE is mainly based on multilateration, where the UE performs reference signal time difference (RSTD) measurements based on the transmission of positioning reference signal (PRS) from multiple transmission points/neighbouring cells. On the other hand, 5G NR network may accurately localize a target UE with a single transmission point/cell by transmitting the PRS over directional beams with high time and angle resolution due to increased bandwidth and array size, respectively. The PRS, or uplink sounding reference signal (SRS), is configured currently to be transmitted over predefined time intervals and/or based on requests from the UEs. The reference cellular-based positioning architecture mainly consists of UEs, RAN, and CU/CN with positioning server and service client. The positioning information (can be referred to as localization information) may be requested by and/or reported to a UE or the CN. LTE defines the PRS as part of the SRS, which may allow to precisely measure the observed time difference of arrival (OTDOA) for localization when detecting the reference signals from multiple neighbouring cells. In LTE systems, the PRS may be cell-specific and uses the time differences between the target UE and the (neighbouring and reference) cells to acquire the RSTD measurements. More specifically, the OTDOA may be used for multilateration as follows: three or more neighbouring cells transmit downlink PRSs to a target UE, which acquires the OTDOAs by measurements and then forwards a quantized version of such information to a localization server that estimates the position of the UE. As discussed above, in 5G the network may position a target UE with a single transmission point/cell by transmitting the PRS over directional beams with high time and angle resolution due to increased bandwidth and array size, respectively. This may be performed via mmWave frequencies, for example.

In this context, predefined/periodic (re) transmissions of the PRS/SRS may lead to inefficient utilization of the positioning resources, and may also cause unnecessary energy consumption at the target UE(s). Therefore, there is provided a solution for enhancing positioning efficiency in a wireless communication network.

FIG. 2 illustrates a flow diagram according to an embodiment. Referring to FIG. 2, a method for a UE of a wireless communication network is provided, the method comprising: obtaining a first measurement data associated with a determined position of the UE and second measurement data, the first and second measurement data obtained by performing measurements by the UE (block 202); obtaining a difference value indicative of a difference between at least one measurement value of the first measurement data and at least one measurement value of the second measurement data (block 204); comparing the difference value with at least one repositioning threshold value provided by the wireless communication network to the UE (block 206); and if the difference value exceeds the at least one repositioning threshold value, triggering a transmission of a repositioning request to a network node of the wireless communication network (block 208).

FIG. 3 illustrates a flow diagram according to an embodiment. Referring to FIG. 3, a method for a network node of a wireless communication network is provided, the method comprising: determining a position of a user equipment, UE, of the wireless communication network, wherein a first measurement data is associated with the determined position of the UE (block 302); configuring the UE to perform at least one measurement to obtain a second measurement data or obtaining, by the network node, the second measurement data based on a virtual device-to-device, D2D, communication link between the UE and another UE of the wireless communication network (block 304); and if a difference value indicative of a difference between at least one measurement value of the first measurement data and at least one measurement value of the second measurement data exceeds at least one repositioning threshold value, performing a repositioning procedure on the UE (block 306).

The described methods of FIGS. 2 and 3 may be applicable in the system (i.e. wireless communication network) of FIG. 1, for example. The UE(s) discussed with respect to FIGS. 2 and 3 may be, for example, UE 100, or UE 102, or some other similar network device(s). The network node discussed with respect to FIGS. 2 and 3 may refer to network node 104, or to CN 110/CU 108, for example, or to some other network element configured to carry out the described method steps. The considered solution may allow the network to save energy and/or radio resources as the PRS/SRS transmission may be triggered if significant changes are detected (i.e. computed difference value(s) exceeds the given threshold(s)). Otherwise, the PRS/SRS transmission may not be triggered. However, there may be a time threshold or timeout timer which may trigger the PRS/SRS transmission. This will be discussed later in more detail.

The locally performed measurement(s) at the UE may enable the network and/or the UE to continuously verify the validity of the last estimated position (e.g. obtained using the PRS/SRS transmission). Henceforth, PRS/SRS transmission or similar procedure is referred to as repositioning procedure (see also block 306). Repositioning request transmitted in block 208 may be understood as a request from UE to network to start said repositioning procedure. However, as expressed above, said repositioning procedure may be triggered in some cases by the network node also. Repositioning may also be referred to as relocalization, and hence repositioning procedure and repositioning request can be referred to as relocalization procedure and relocalization request respectively. Previously, such cellular based positioning procedures have relied on the transmission of the PRS/SRS over predefined/periodic time intervals. Such PRS/SRS transmissions may lead to inefficient utilization of the limited positioning resources, especially for stationary or low-mobility target UEs. For example, periodic transmission may cause scheduling restrictions resulting inefficient use of resources. This may be the case, for example, with beam domain operation. In this regard, the prior solutions do not provide any mechanism to locally track and validate position estimates based on the disposition between network node-UEs links and the D2D links and/or based on sensor data to validate current UE position estimation.

The inventors have recognized at least two ways to provide local UE data that can be used to determine sufficient change, and trigger the repositioning procedure. According to an embodiment, the first and second measurement data comprise measurement data associated with a D2D communication link between UE 100 and another UE 102. This D2D communication link can be seen in FIG. 1 and in FIG. 4A also. In an embodiment, the at least one measurement value of the first measurement data and the at least one measurement value of the second measurement data comprises an angle of departure, an angle of arrival, and/or a separation distance (e.g. based on time of flight (ToF)).

In addition or alternatively, in an embodiment the first and second measurement data comprise sensor measurement data obtained via one or more sensors. The one or more sensors may comprise a pedometer, a barometer, and/or a satellite positioning circuitry, such as GPS, GLONASS, Galileo and the like. In such case the values of the first and second measurement data may comprise steps or air pressure, for example. To give one example, certain air pressure can be associated with estimated UE position. If measured air pressure change exceeds a threshold, repositioning procedure may be triggered. As described, sensor data can be used in addition to the D2D measurement data or as an alternative to the D2D measurement data. However, it may be especially beneficial to utilize both types of data in order to efficiently estimate/validate that the UE position has changed, and repositioning procedure should be triggered.

It is shortly noted that the change exceeding a threshold for a given value may be relative or absolute. In some cases it may be beneficial to compute relative change, and thus utilize a threshold suitable for determining whether the relative change is significant enough to trigger the repositioning procedure.

So, in general, the solution considers reconstructing the geometry of the network based on D2D measurement data and/or sensor measurement data. Assuming beam-domain processing at both the network node and the UEs, different distance and angle measurements may be used to keep track of the position of the UEs over time and detect changes with respect to the last estimated position. A retransmission of the PRS by the network node may be triggered if changes in the position of the UEs are detected to be above a certain threshold. It should be noted that underlying D2D measurements may provide energy savings as D2D UEs generally closer to each other than to the network node, and the power consumption of such short-range D2D link may be relatively small with respect to continuous PRS signalling between UE and network node. Furthermore, such limited PRS resources can be available for other UEs and/or optimized to reduce the interference. In addition, direct measurement with the network node (e.g. gNB) may require that a target UE stays in connected mode, which may lead to inefficient use of energy and resources at both the network node and UE.

The described solution may enable saving both PRS and uplink SRS resources, and may be applicable to both network-based and UE-based positioning methods as described herein.

Let us then discuss a bit more in detail how the difference value can be obtained. $t\_0$ may be the reference time at which the position of the UE(s) is known or at least estimated. What this means is that, for example, (re) positioning procedure has been performed so that the network node 104 has determined UE's 100 position. In case D2D link is utilized, the network node 104 may have determined position of a plurality of UEs, and possibly paired these UEs with each other based on position of the UEs. As discussed above, $t\_0$ may be the reference time at which position of the UE may be known or estimated, and the first measurement data may be associated with said reference time. Further, in the following, $\Omega\_m(t\_i)$ may refer to the mth measurement (where $m=1, \ldots, M$) performed by UE 100 at time $t\_i$, $\forall i > 0$. Here, valid measurements may be, e.g., angle of departure (AoD), angle of arrival (AoA), and separation distance, where the latter can be based on e.g., ToF, as discussed above. The measurements $\Omega\_m(t\_i)$, $\forall m$, may be used to detect changes in the position of the UEs at time $t\_i$ with respect to the reference time $t\_0$. So, for example, if first measurement data comprises certain AoD value, second measurement data may comprise another AoD value. Difference between these values may be subject to comparison with a given repositioning threshold. If AoD value has changed so that the change exceeds a threshold, repositioning procedure may be triggered. To this end, the network node may provide a set of thresholds $\delta\_m$, $\forall m$, that quantifies the amount of change in the measurements above which the UE 100 need to be repositioned via PRS transmission. In other words, the network node may reposition the UE 100 whenever $|\Omega\_m(t\_i)-\Omega\_m(t\_0)|>\delta\_m$, $\forall m$, or after some predefined timeout condition is fulfilled. Instead of absolute thresholds, the network node may also provide normalized thresholds and, in this case, the triggering condition above can be written as $|(\Omega\_m(t\_i)-\Omega\_m(t\_0))/\Omega\_m(t\_0)|>\delta\_m$, $\forall m$. So, the difference value may be computed in many different ways, and the comparison with the provided thresholds may change. However, the basic idea may be to trigger the repositioning procedure, by transmitting the repositioning request, if change in one or more measurement values exceeds the given one or more respective thresholds. At this point it is also noted that t_i may be associated with second measurement data. However, one needs to understand that second measurement data may be computed/updated more than once, and thus the actual time instant may change according to the time instant of the currently updated second measurement data. This may be different to the first measurement data which may be fixed and obtained at the reference time instant t_0.

Note that a function of the measurements $f(\Omega\_1(t\_i), \ldots, \Omega\_M(t\_i))$ may be used for the comparison in place of the individual measurements. Here, a valid function of the measurements may be, e.g., the weighted sum of the individual measurements. In this case, the network node may reposition the UE 100 in response to determining that $|f(\Omega\_1(t\_i), \ldots, \Omega\_M(t\_i))-f(\Omega\_1(t\_0), \ldots, \Omega\_M(t\_0))|>\delta$, where $\delta$ is a repositioning threshold provided by the network node.

In another example, there may be more than one measurement parameter (e.g. AoD and AoA, or any other described value such as sensor measurement value) in the first and second measurement data. In such case the UE 100 may compute difference value regarding each measurement parameter, and compare the difference values with respective repositioning thresholds. In an embodiment, the repositioning request is transmitted if at least one of the difference values exceeds the respective threshold. In an embodiment, the repositioning request is transmitted if at least two of the difference values exceeds the respective thresholds. In an embodiment, the repositioning request is transmitted if each computed difference value exceeds the respective threshold. Hence, utilizing more than one measurement parameter may provide more accurate validation that the UE's 100 position has changed, and repositioning procedure should be triggered. As also noted above, it may be possible to utilize a function instead of individual measurements in the comparison.

Although UE 100 is used herein as an example, the skilled person understands that similar repositioning solution can be used for a plurality of UEs.

Figure 4C:
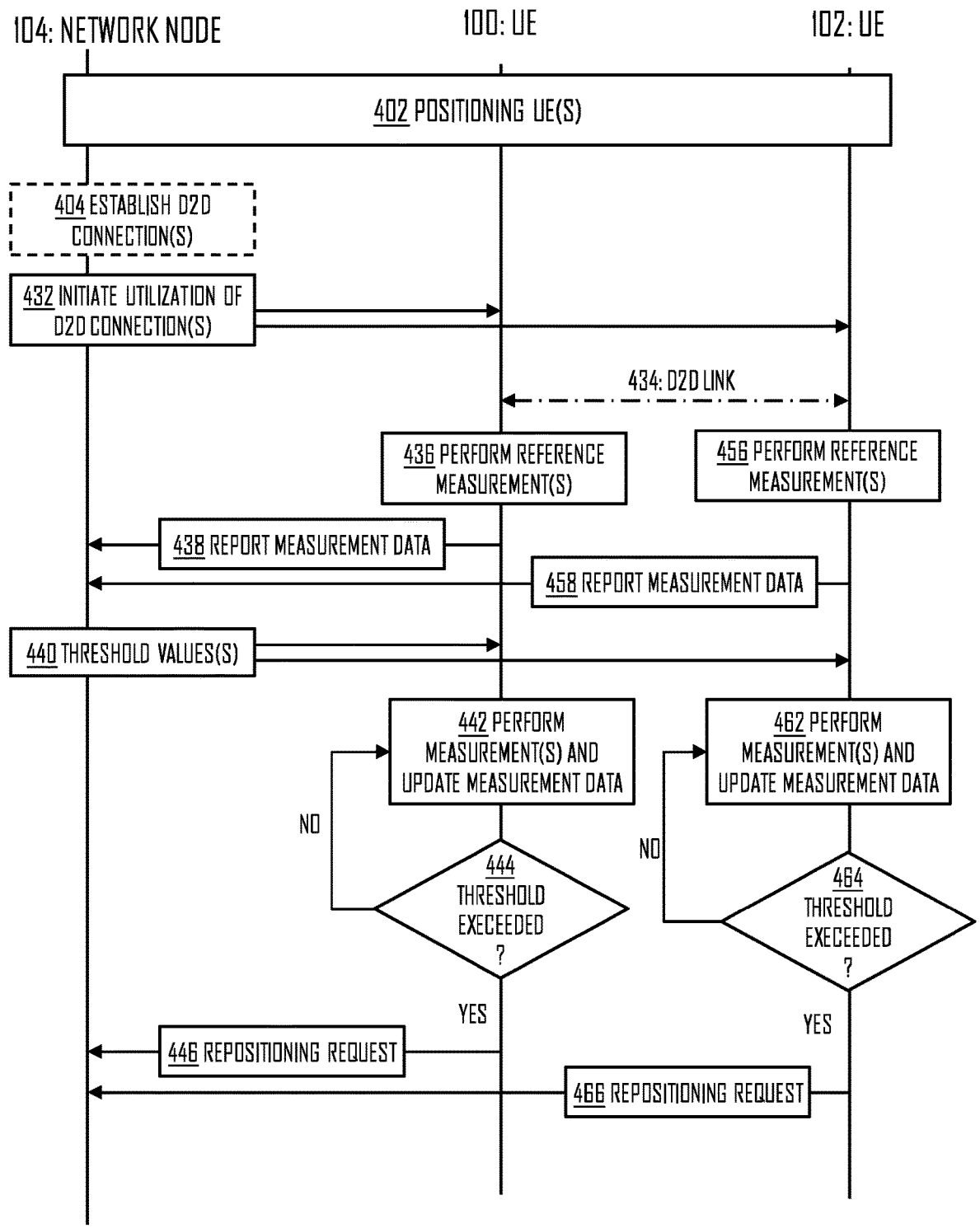

Let us then go further into some details with the help of FIGS. 4A, 4B, and 4C illustrating some example embodiments. Referring first to FIG. 4A, $d_1$ denotes distance between UE 100 and network node 104, $d_2$ denotes distance between UE 102 and network node 104, and x denotes distance between UEs 100, 102. Further, different angles are depicted: $\theta_1$ may represent AoD between network node 104 and UE 100, $\theta_2$ may represent AoD between network node 104 and UE 102, $\phi_1$ may represent AoA between network node 104 and UE 100, $\phi_2$ may represent AoA between network node 104 and UE 102, $\beta_1$ may represent AoA between UE 102 and UE 100, and $\beta_2$ may represent AoA between UE 100 and UE 102. $\Psi_1$ and $\Psi_2$ represent angles of the triangle formed by the three devices as shown in the Figure. $\Psi$ may more precisely refer to Anchor Angle Difference (AAD). $\Psi_1$ may be ADD if UE 102 is target UE and UE 100 is supporting UE. Similarly, $\Psi_2$ may be ADD if UE 100 is target UE and UE 102 is supporting UE.

Referring now further to FIG. 4B, according to an embodiment, in block 402, the network node 104 may determine positions of a plurality of UEs 100, 102. This may mean that the network node 104 determines and/or computes $\theta_1$, $\theta_2$, $\phi_1$, $\phi_2$, $d_1$, and $d_1$, for example. This determination may be based on PRS transmission and corresponding measurements by the UEs, for example. After this, the network node 104 may reposition the UEs 100, 102 if repositioning is required based on UE measurements on the D2D connection between the UEs 100, 102 (see e.g. D2D link 408 between UEs 100, 102).

Based on the UE position estimates obtained in block 402, the network node 104 may pair the plurality of UEs based on the position estimates of the UEs. I.e. groups of two may be generated so that, for example, UEs closest to each other may be assigned to the same group. It is noted at this point that only one pair (i.e. UE 100 and UE 102) is shown in the Figures for simplicity reasons. However, it may be possible to pair the UE with more than one UE. For example, UE 100 may thus be paired with UE 102 and additionally with some other UE.

The pairing may be indicated to the UEs, for example, by triggering the UEs to establish D2D communication links (block 404). This may be indicated to the UEs with signalling of block 406, for example. However, block 404 may optional as there may already be an existing D2D link between UE 100 and UE 102. If however, such link does not exists, the network node 104 may cause the UEs 100, 102 to establish such link for positioning purposes. The D2D communication link is depicted with arrow 408 in FIG. 4B.

As discussed above, the network node 104 may schedule the UE(s), at time t_0, to perform measurements to obtain the first measurement data. For example, this may mean that the UE 100, 102 performs measurements on its D2D link(s) (including, e.g., time and angle measurements). The network node 104 may further instruct the UE 100, 102 to store the measurements $\Omega\_m(t\_0)$, $\forall m$, to be used as reference measurements associated with the position estimation determined in block 402. This signalling may be performed in block 406, for example. In the specific example of FIG. 4B, the first measurement data may be obtained in block 412 before starting to obtain the second measurement data.

According to an embodiment, in block 406, the network node 104 provides the at least one repositioning threshold value to the UE 100, 102. The network node may thus configure the threshold values $\delta\_m$, $\forall m$, (based on, e.g., some key performance indicators (KPIs)) and transmits them to the UE 100, 102 via Radio Resource Control (RRC), Media Access Control (MAC), or Physical (PHY) level signalling.

The network node 104 may further trigger the UE 100, 102 to perform iterative procedure in which the UE 100, 102, for each UE pair, may keep track of their relative positioning over time, and compares the changes to the provided thresholds (see blocks 412 and 414; and 422 and 424). That is, in block 412, the UE 100 may perform measurement(s) and obtain and/or update the second measurement data. The UE 102 may perform similar operations in block 422. The UE 100, 102 may, for example, obtain/determine $\beta_1$, $\beta_2$, $\Psi$, and/or x.

In block 414, if repositioning threshold(s) are exceeded, the process may continue to block 416, i.e. the UE 100 transmitting the repositioning request to the network node 104. However, if repositioning threshold(s) are not exceeded, the process may go back to block 412. UE 102 may perform similar operations in in blocks 424 and 426. Blocks 412, 422, if the condition for transmitting the request are not met, may be performed continuously with certain intervals until the condition is met (i.e. process goes to block 416, 426), or until a certain time threshold is met. Hence, according to an embodiment, the UE 100 is configured to trigger the transmission of the repositioning request to the network node if a predetermined time threshold is exceeded. So, at time t_i, ∀i>0, until some predefined timeout condition or threshold is fulfilled, each UE in each UE pair may perform new measurements on its D2D links (block 412, 422). Then, UEs may update the measurements $\Omega$_m(t_i), ∀m, and compare them with the reference measurements $\Omega$_m(t_0), ∀m. If any UE in the UE pair detects a variation above the corresponding threshold, e.g. |$\Omega$_m(t_i)–$\Omega$_m(t_0)|>$\delta$_m, ∀m (block 414, 424), the UE may trigger the network node 104 to reposition them (block 416, 426). The network node 104 may then perform repositioning procedure by transmitting the PRS, for example. The process may then go back to block 412, 422, keeping in mind that the first measurement data may be updated, to correspond to the time instant associated with the new estimated position, before starting to update the second measurement data.

According to an embodiment, the first measurement data is obtained prior to obtaining the second measurement data in block 412. The first measurement data may be obtained once after (re) positioning, and after that the UE 100, 102 may update the second measurement data. The first measurement data may yet again be updated once after the repositioning occurs again or for the first time.

FIG. 4C illustrates an embodiment. Referring to FIG. 4C, blocks 402 and 404 may be similar as discussed with respect to FIG. 4B. Block 432 may be similar as block 406. However, in this embodiment, the thresholds may not be transmitted in block 432 from the network node 104 to the UE 100, 102 as they may be transmitted in block 440 instead.

Hence, in block 436, 456, the UE 100, 102 may perform reference measurement(s) to obtain reference data. Reference data may be referred to also as first measurement data. These measurement(s) may be performed on the D2D link 434 between the UE 100, 102, for example. At time t_0, the network node 104 may schedule each UE in each UE pair to perform measurements on its D2D link (e.g. time and angle measurements) and instructs the UEs to store the measurements $\Omega$_m(t_0), ∀m, to be used as reference measurements and report such measurements to network node 104.

Hence, in block 438, 458, the UE 100, 102 may report the first measurement data to the network node 104. The network node 104 may receive the first measurement data from the UE 100, 102. Based on the received first measurement data from one or more UEs 100, 102, the network node 104 may determine the at least one threshold value and transmit the at least one repositioning threshold value to the UE 100, 102 (block 440). The UE 100, 102 may receive the at least one repositioning threshold value from the network node 104. The network node may thus configure the threshold value(s) $\delta$_m, ∀m, (based on, e.g., some KPIs and exploiting the reported D2D measurements) and transmit them to the UEs via RRC, MAC, or PHY level signalling. So, instead of giving the threshold(s) before first measurement data is obtained (e.g. as in FIG. 4B), the network node 104 may first instruct the UE 100, 102 to report the first measurement data to the network node 104, and after that indicate the threshold(s) to the UE 100, 102. This may enable the network node 104 to provide more accurate threshold(s), for example.

In general terms, the threshold(s) may be provided by the network based on, e.g., UE reports, accuracy requirements at the UE, and available statistical information about network. UE reports may comprise, for example D2D measurement data as described above.

Blocks 442, 444, 446 and operations thereof may be similar to that of blocks 412, 414, 416 of FIG. 4B. Similarly, Blocks 462, 464, 466 and operations thereof may be similar to that of blocks 422, 424, 426 of FIG. 4B. However, it is noted that in block 442, 462 the UE 100, 102 may not obtain the first measurement data as it is already obtained based on measurement(s) in block 436, 456. Hence, the second measurement data may be obtained in block 442, 462. If repositioning request is transmitted in block 446 or 462, the process may go back to block 436, 456, or possibly to block 412, 422 of FIG. 4B.

It should be noted that the D2D communication link related measurement data may be used to refine the UE position estimates by using additional D2D measurements. These may include, for example, the following parameters: $\beta_1$, $\beta_2$, $\Psi$, and/or x. These were discussed with reference to FIG. 4A above.

As an example, the D2D distance estimate x at the network node may be expressed in term of other known parameters as (see FIG. 4A):

$$\hat{x} = d_2 \frac{\sin(\theta)}{\cos(\phi_1)}$$

Network node may compare $\hat{x}$ with the D2D reported value x (i.e. this value may be reported by the UE 100 and/or UE 102 to the network node 104). Similarly, by using the disposition of transceiver and underlying trigonometric combination, equations for other parameters may be obtained. In the case of miss-match between estimated and reported measurement, the network node 104 may trigger the repositioning request. Hence, in an embodiment, the network node 104 triggers repositioning procedure if a difference exceeding a threshold is detected between a UE indicated measurement value and a corresponding value computed by the network node 104. One example may be comparison between $\hat{x}$ and x. Furthermore, by using the reported D2D measurements, the network node may more efficiently fine tune the corresponding threshold values (as discussed) tailored to specific D2D pairs and, thus, redundant PRS transmission(s) may be avoided or at least mitigated.

According to an embodiment, with reference to FIGS. 4A to 4C, the system may further utilize sensor data in addition to the D2D link measurement data. For this purpose, the network node 104 may provide the UE 100, 102 further threshold value(s) in block 406 and/or 440. Furthermore, the UE 100, 102 may be configured by the network node 104 to perform sensor measurements with one or more sensors. The one or more sensors may be, for example, internal sensors of the UE 100, 102. Utilizing the sensor data in addition to the D2D link measurement data may enable the UE 100, 102 to trigger the repositioning request message transmission if either D2D measurement value(s) or sensor measurement value(s), or both, have changed such that the change exceeds the corresponding threshold(s). So, for example, the sensor data may be used as a further way to validate that the position has actually changed, and PRS is required. It is noted that the threshold value(s) indicated in block 440 may be computed based on both the D2D measurement data and sensor measurement data indicated by the UE(s) to the network node (block 438, 458).

According to an embodiment, the UE 100, 102 is configured to perform operation comprising: obtaining a first difference value indicative of a difference between at least one D2D measurement value of the first measurement data and at least one D2D measurement value of the second measurement data; obtaining a second difference value indicative of a difference between at least one sensor measurement value of the first measurement data and at least one sensor measurement value of the second measurement data; and if the first or second difference value exceeds a corresponding repositioning threshold value, triggering the transmission of the repositioning request to the network node. In an embodiment, both the first and second difference value are required to exceed the corresponding repositioning threshold value in order to trigger the transmission of the repositioning request to the network node.

So, at time t_0, the network node 104 may schedule each UE in each UE pair to perform measurements on its D2D link (e.g., time and angle measurements) and triggers each UE to perform measurements using the locally available sensors (e.g., pedometer, barometer and other sensors). The network node 104 may instruct the UEs to store the measurements $\Omega\_m(t\_0)$, $\forall m$, and $v(t\_0)$ ($v(t\_0)$ s refers to the sensor measurement data at t_0) to be used as reference measurements and report such measurements to network node 104. The network node 104 may configure the threshold values (based on, e.g., some KPIs and exploiting the D2D measurements) for D2D and sensor measurement values, and transmits them to the UEs via RRC-, MAC-, or PHY-level signaling, for example. The network node may trigger an iterative procedure whereby the UEs in each UE pair may keep track of their relative positioning over time. The positioning may be based on both the D2D measurement data and local sensor measurement data which may be tracked by the UE(s) over time. At time t_i, $\forall i>0$, until some predefined timeout condition is fulfilled, each UE in each UE pair may perform new measurements on its D2D links and on its locally available sensors. Then, UEs may update the measurements $\Omega\_m(t\_i)$, $\forall m$, and $v(t\_i)$ (i.e. sensor measurement at t_i), and compare them with the reference measurements $\Omega\_m(t\_0)$, $\forall m$, and $v(t\_0)$, respectively. If UE detects a change or difference exceeding the corresponding threshold, e.g., $|\Omega\_m(t\_i)-\Omega\_m(t\_0)|>\delta\_m$ and/or $|v(t\_i)-v(t\_0)|>\delta$, the UE may trigger the network node 104 to reposition the UE, and further possibly UEs that are paired with the UE that transmitted the repositioning request.

Figure 5A:
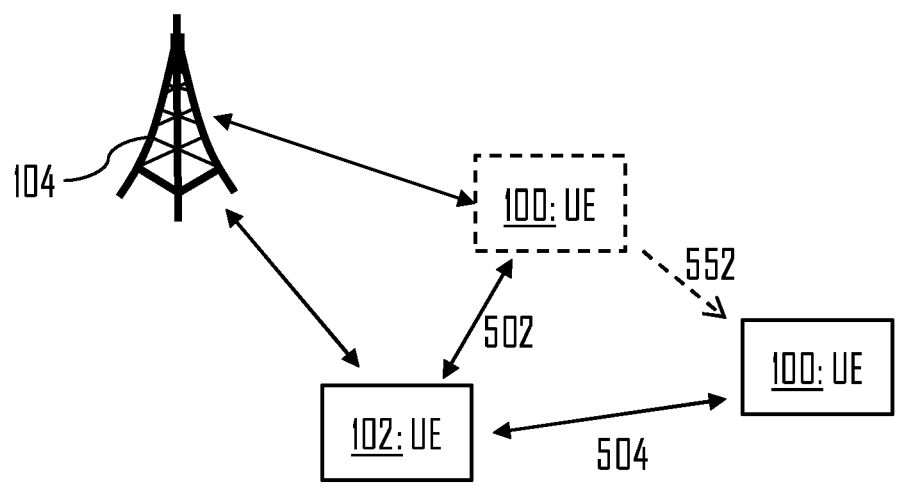
FIGS. 5A and 5B illustrate some examples in which sensor measurement data may be utilized to enhance repositioning procedure.
Figure 5B:
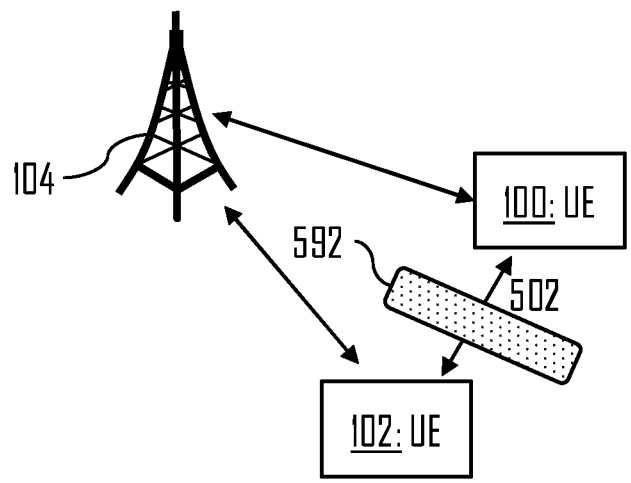

FIGS. 5A and 5B relate to some embodiments in which the sensor measurement data or simply sensor data may be useful. Referring to FIG. 5A, UEs 100, 102 may be paired with each other and have D2D link 502 therebetween. UE 102 may be stationary (i.e. maintain its position), but UE 100 may move to another position as indicated with arrow 552. Hence, position of UE 100 should be updated. However, as the link 502 changes to 504 (or the measured parameters, such as angle and distance change), both UE 100 and UE 102 may request repositioning from the network node 104. This may be futile with respect to UE 102. So, UE 102 being static for all t, but the underlying D2D measurements $\Omega\_m(t\_i)$ may change, and thus UE 102 may also trigger (i.e., $|\Omega\_m(t\_i)-\Omega\_m(t\_0)|>\delta\_m$) network node 104 for the repositioning, and it may lead to unnecessary PRS resources. To avoid this, each UE, in addition to D2D measurements, may compare the measurements obtained from the one or more sensors, (e.g., pedometer, barometer) $|v(t\_i)-v(t\_0)|>\delta$. Thus, redundant triggering from static UEs in D2D pair may be avoided. That is, for UE 100 both sensor data and D2D measurement data may indicate change that exceeds respective thresholds, and thus the repositioning procedure may be triggered. However, even though D2D measurement data may indicate change exceeding D2D related threshold, UE 102 may not trigger the repositioning request as its local sensor data (i.e. UE specific sensor data) may indicate no change or at least a change that exceeds the sensor data threshold (e.g. altitude changes and/or steps are taken over a certain threshold). Hence, using both D2D measurement data related threshold and sensor measurement data related threshold, and requiring both to be exceeded, may bring additional benefits.

Similarly, with reference to FIG. 5B, a blocker element 592 may cause the D2D link 502 to deteriorate so that repositioning request should be triggered based on the D2D measurement data. However, again, if neither or one of the UEs 100, 102 move, repositioning may be unnecessary. Hence, similarly as with respect to FIG. 5A, the sensor data or specifically UE specific sensor data may prevent the unnecessary repositioning request(s) for both UEs.

In a worst case scenario, with reference to FIG. 5B, the blocker element 592 may be unknown to the network node 104. The network node 104 may retransmit the PRS and reposition both UEs 100, 102 independently via the standard positioning procedure. However, according to an embodiment, the network node 104 further uses the reported D2D measurement data (i.e. second measurement data from UEs 100, 102) to identify the problematic UE pair, and changes the UE pairs based on the D2D measurement data. That is, UE 100 may be paired with another UE that is possibly not blocked by the blocker element 592 for D2D communication. Similarly, UE 102 may be paired with another UE. Hence, if the D2D link deteriorates, the network may arrange new pairs at least for the UEs that have experienced D2D link failure/deterioration. The repositioning procedure may be prevented to be triggered based on the sensor measurement data related threshold also in this example.

Another example may be the case where two or more UEs (e.g. one UE pair) is moving together with respect to the network node, but their position with respect each other remains the same or substantially the same. For example, this may happen in public transportation or in a car or some other vehicle. In this case the D2D measurement data may indicate no change exceeding the D2D related threshold. However, sensor measurement data may indicate change exceeding sensor measurement related threshold, and thus repositioning may be triggered accordingly.

Figure 6:
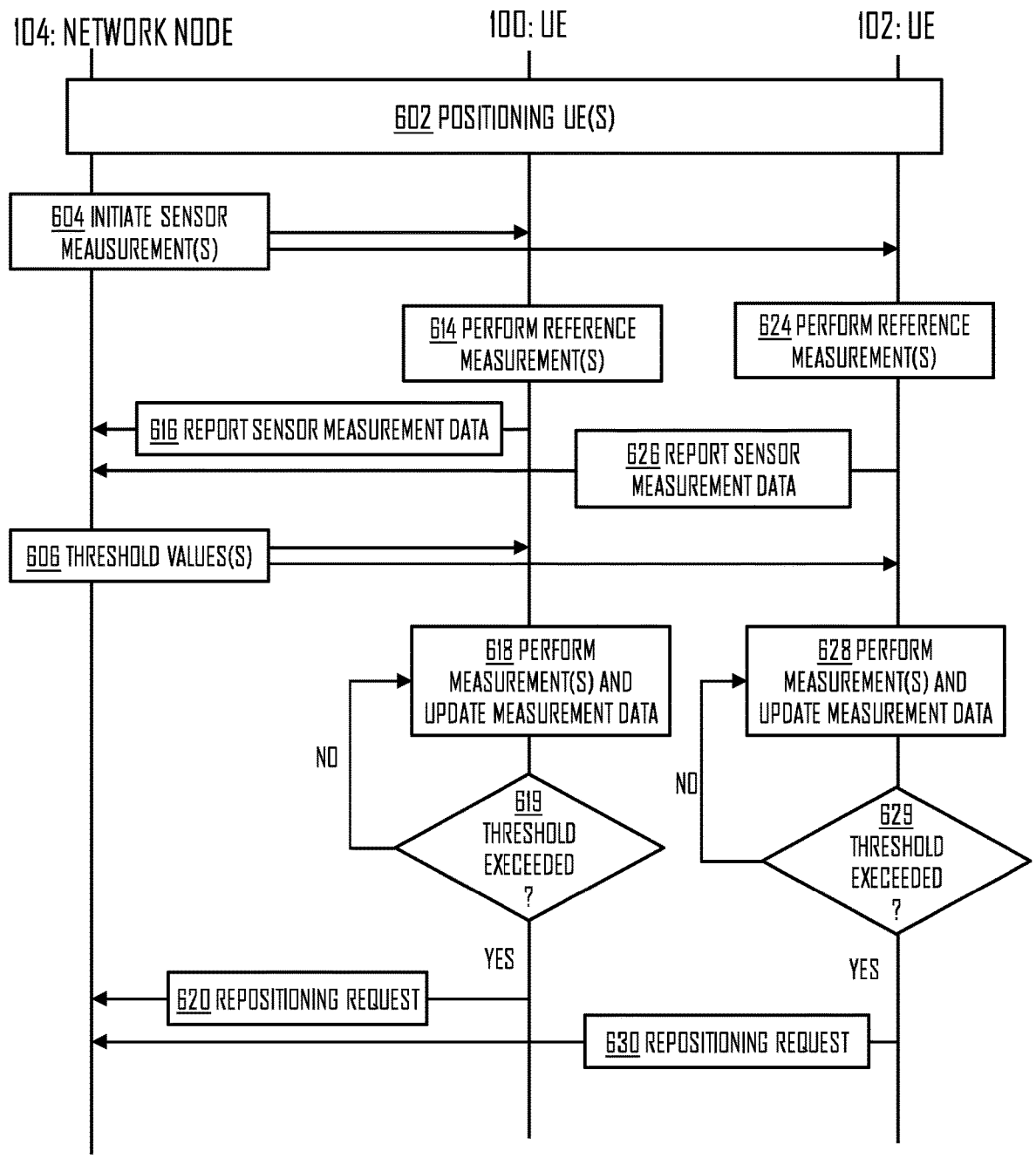
FIG. 6 illustrates an embodiment.

Let us then discuss some embodiments in which the described method utilizes solely sensor data or some other data that is locally available to the UE or UEs. That is, D2D measurement data is not necessarily required for triggering the repositioning procedure. Such solutions are discussed with reference to FIG. 6 illustrating an embodiment.

Positioning of UE(s) 100, 102, by the network node 104, may be performed similarly in block 602 as discussed above with reference to FIGS. 4B and 4C (i.e. block 402).

In block 604, the network node 104 may trigger (at time t_0) each UE 100, 102 perform measurements (e.g. pedometer, barometer and/or sensor(s)). As discussed above, the sensor(s) may be, for example, internal sensors of the UE 100, 102. The network node 104 may further instruct the UEs 100, 102 to store such measurements to be used as reference measurements.

In block 614, 624, the UE 100, 102 may perform said reference measurement(s) (i.e. one or more measurements per device, e.g. one for each measured value). In some embodiments, the UE 100, 102 may have already reference data available without further measurements. For example, the UE 100, 102 may constantly or periodically compute/determine number of steps, and update step counter thereof. Hence, no specific measurement may be needed to obtain reference measurement data (i.e. first measurement data). However, the reference measurement(s) may be performed at some point in time, either before or after receiving (e.g. in response to) receiving indication/request (e.g. block 604) from network node 104 to obtain reference data.

In block 616, 626, the UE 100, 102 may report the first measurement data (i.e. sensor measurement data obtained from the reference measurement(s)) to the network node 104.

In block 606, the network node 104 may configure the at least one threshold value to the UE 100, 102. The configuring may be performed via RRC, MAC or PHY level signaling, for example. The network node 104 may determine the at least one threshold value based on one or more KPIs and/or the first measurement data obtained from the UE 100, 102.

According to an embodiment, additionally or alternatively to transmitting the first measurement data, the UE reports, to the network node, sensor information including device capabilities, i.e. which sensors the device supports. Based on sensor information, the network node may determine and indicate appropriate threshold values corresponding to each UE supported sensor.

According to an embodiment, the at least one threshold value is UE specific. In another embodiment, the at least one threshold value is same for UEs in same UE pair. In another embodiment, the at least one threshold value is same for each UE configured for the described positioning procedure by the same network node 104.

The network node 104 may further trigger, similarly as in FIGS. 4B and 4C and embodiments thereof, an iterative procedure whereby UE 100, 102 may monitor their relative positioning by exploiting the sensor measurement(s). This iterative process is depicted with blocks 618, 619 for UE 100 and blocks 628, 629 for UE 102. That is, at subsequent update time instants $t\_i$, $\forall i>0$, and until some pre-configured timeout condition $\Delta t$ is fulfilled, each UE 100, 102 may update the sensor measurements $v(t\_i)$ (block 618, 628), and compare the obtained sensor measurements against the reference measurements $v(t\_0)$ obtained at time $t\_0$. For example, the difference values may be obtained. In block 619, 629, the difference value(s) may be compared with the corresponding threshold value(s). If UE 100, 102 detects a variation above the corresponding threshold (i.e. at least one or all difference values (if more than one is used) exceed the corresponding threshold(s)), e.g. $|v(t\_i)-v(t\_0)|>\delta$, UE 100, 102 may transmit the repositioning request to network node 104 (block 620, 630). So, the network node 104 may receive a repositioning request from the UE 102 based on the difference value exceeding the at least one repositioning threshold, for example.

Figure 7A:
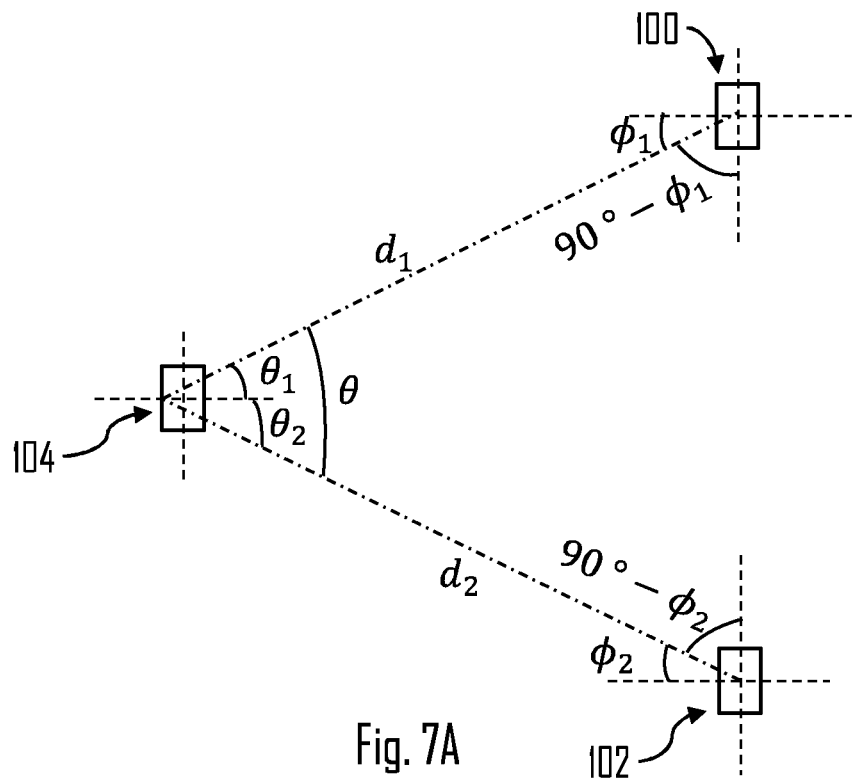
FIGS. 7A and 7B illustrate some embodiments utilizing virtual D2D or sidelink pairing.
Figure 7B:
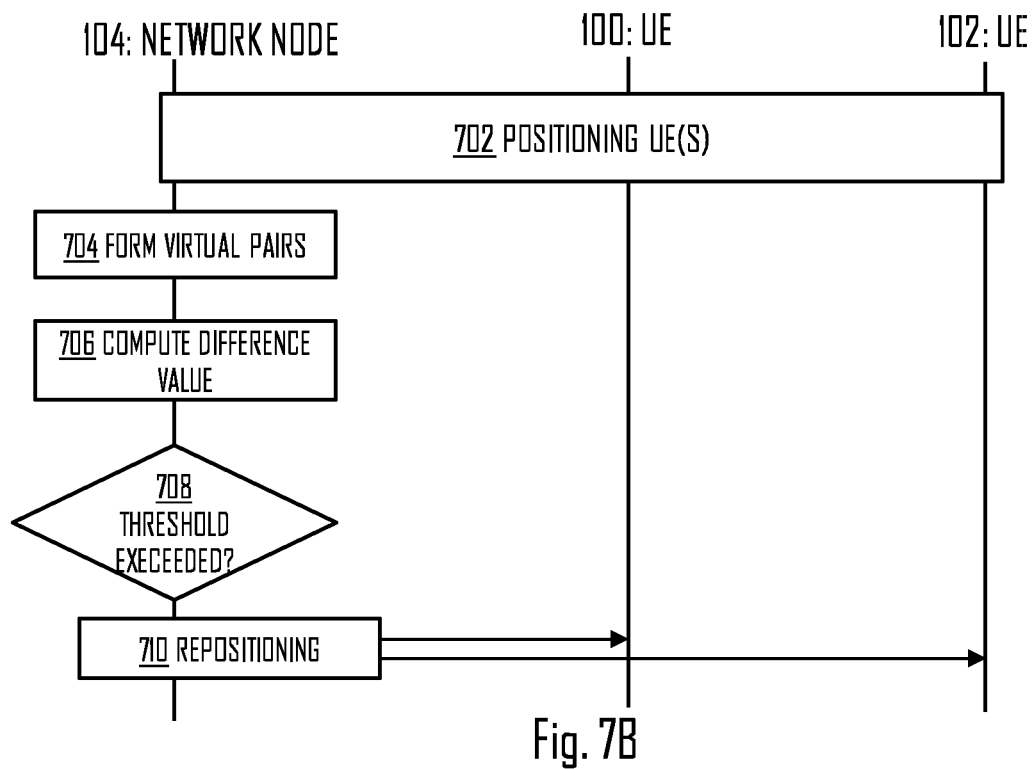

So, the considers method may utilize D2D measurement data and/or sensor measurement data in determining whether the position of the UE is changed so much that repositioning request triggering the repositioning procedure should be sent to the network node 104. It should be noted that although only two UEs 100, 102 are shown in FIG. 6, there can be more than two UEs that are configured similarly by the same or different network node. FIGS. 7A and 7B illustrate some embodiments. As discussed shortly above with reference to FIG. 3, the network node 104 may obtain the second measurement data based on a virtual D2D communication link between UEs (e.g. UE 100 and 102). In the embodiments of FIGS. 7A and 7B, the UEs 100, 102 may not need to perform any measurement(s) and/or D2D links for the repositioning procedure. That is, the first and second measurement data may be obtained by the network node 104 without requiring measurement data from the UEs. This may mean that the repositioning may be triggered by the network node 104 based on determining whether or not the UE position(s) have changed so that the change exceeds a given threshold. As said, the determination may be based on the network node 104 determining/computing parameters of virtual D2D links between the UEs 100, 102. Virtual here may refer to a D2D link that is not actually indicated nor used by the UEs; simply utilized for calculation purposes at the network node 104. It is also noted that the term measurement data should be understood broadly in the context of embodiments of FIGS. 7A and 7B as the network node may obtain said data via computing process(es). That is, the network node 104 may, at time $t\_0$, compute virtual D2D link information in each UE pair (e.g. distance and/or angle between UEs) by exploiting the geometry related with the position of the UEs obtained in block 702. The network node may store such information to be used as reference measurement data for each UE. However, said data may still need to be understood as measurement data as it may be based on measurements performed by the UE(s) 100, 102 and/or network node 104, for example.

Prior to computing the reference data, the network node 104 may determine position (block 702) of the UEs 100, 102 similarly as in blocks 402, 602. Based on the position estimates, the network node 104 may form UE pairs (block 704). As the pairs are virtual, the network node 104 does not necessarily indicate said pairs to the UEs. Instead, the network node 104 may utilize said virtual pairs in determining the reference data and changes in said reference data. Furthermore, the network node 104 may utilize repositioning threshold value(s) (e.g. based on some KPIs) for each UE, and iteratively determine whether or not a difference value exceeds the corresponding threshold (block 708). The difference value may be computed in block 706 based on the reference data and changes in said reference data, i.e. based on difference of data obtained at time $t\_0$ and data obtained at $t\_i \forall i>0$. If threshold is exceeded, e.g. $|\Omega\_m(t\_i)-\Omega\_m(t\_0)|>\delta$, the network node 104 may trigger the repositioning procedure (e.g. transmit PRS) regarding the UE 100 and/or UE 102 (block 710). For example, if the threshold is exceeded, the position of one UE of a UE pair (e.g. UE 100 of UE pair comprising UEs 100, 102) may be updated via repositioning procedure. Based on the updated position, relative position of other UEs of UE pairs, in which the repositioned UE is a member, may be computed utilizing geometry (see FIG. 7A in which position of UE 102 may computed if position (e.g. d1 and angle $\theta_1$ is known) of the UE 100 is known by the network node 104.

As an example, the underlying geometry rules may be utilized in public transportation (e.g. bus or train), IIoT deployment scenarios or autonomous driving scenarios, in which UEs 100, 102 may be stationary with respect to each other, but may be moving with respect to network node 104.

That is, without the described solution, both UEs would be repositioned utilizing PRS. However, the network node 104 may select to repositioning only one member of the UE pair as their relative position may remain the same. This may reduce signalling even further. The network node 104 may, however, know or determine the position of both UEs 100, 102 as one is repositioned and the other's position may be determined based on the assumption or information that UEs 100, 102 remain stationary with respect to each other. Hence, according to an embodiment, the network node 104 repositions only one UE of an UE pair if the network node 104 determines that the relative position of the UEs in the UE pair remains the same or at least sufficiently the same (i.e. does not change so that the relative position change exceeds a threshold). Determination of relative position change may be based on e.g. sensor data reported by the UEs or utilizing the virtual pairs as discussed with respect to FIG. 7B.

To further highlight the advantages, let us consider the following: assume that the network node 104 transmits the PRS periodically/aperiodically in predefined time instants with average PRS frequency f_PRS [PRS/s] and consider an observation time T [s], during which the UEs move sporadically N<<f_PRS*T times. The considered solution may enable to reduce the number of PRS transmissions from (f_PRS*T) to (N+1): one at the beginning of the procedure (to establish the reference positions) and one for each time a UE movement or position change above a certain threshold is detected based on e.g. virtual UE pair determination, D2D measurement data and/or sensor measurement data. For instance, if T=1800 s (i.e. 30 min), f_PRS=0.0333 PRS transmissions/s (i.e., the PRS is transmitted on average every 30 s), and N=5 (the UE moves 5 times in 10 minutes), 60 PRS transmissions may be required if the traditional method is used and only 6 PRS transmissions if the considered solution is utilized. This may correspond to about 90% saving of limited position resources and signalling between the UEs and the LMF. Furthermore, with the traditional method, there may be an inherent uncertainty about the UE position between the predefined PRS transmissions, as there may be no way to detect the UE movement. Therefore, the described solution may bring the further benefit that the UE is repositioned in response to or immediately after it changes position or at least the position change exceeding the threshold is detected. Bear in mind that the threshold for position change triggering the repositioning may be different for different applications run on the UE and/or different UEs (e.g. different type of UEs). That is, some applications and/or UEs may require more accurate position information than others. The described solution may enable the network to obtain more detailed position on some UEs than other.

For example, to highlight some benefits, let us further consider a scenario where the UE(s) move seldomly (for example, once per day) and may not have active data links with the network node (e.g. a sensor network scenario or MTC scenario). Assume that the UEs can move at 1 m/s and that 2 m accuracy is required. Since the UE movements may not be predictable, the conventional approach implies that the network may need to continuously track the UE, which may require PRS signalling every 2 seconds (i.e., 30*60*24 PRS transmissions per day). Instead, the considered event-based PRS configuration may need only one PRS measurement per day, since the target UEs track their relative positions over time to detect changes in the network geometry with respect to the last estimated position.

Above some example embodiments were discussed for detecting position change exceeding a threshold that may trigger repositioning procedure either by the UE initiating the procedure or by the network node initiating the procedure. In one example, the detection may be based on D2D measurement data but not sensor measurement data. In another example, the detection may utilize both D2D measurement data and sensor measurement data. In another example, the detection may utilize sensor measurement data but not D2D measurement data. In a further example, the detection may be based on the first measurement data comprising D2D measurement data and the second measurement data comprising sensor measurement data.

Figure 8:
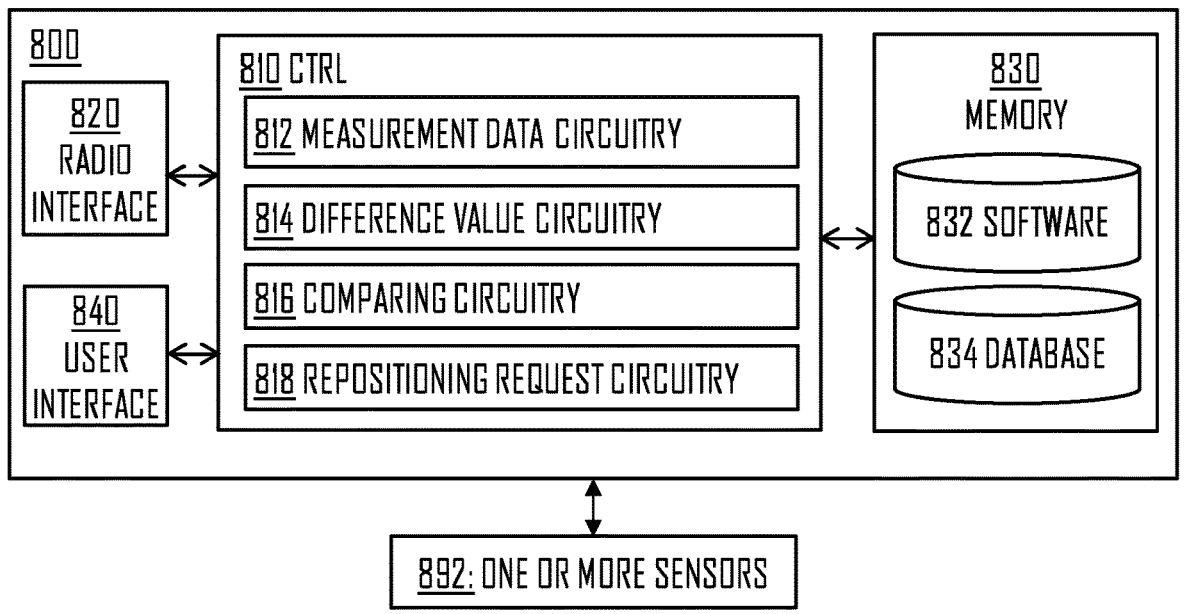
FIGS. 8 and 9 illustrate apparatuses according to some embodiments.
Figure 9:
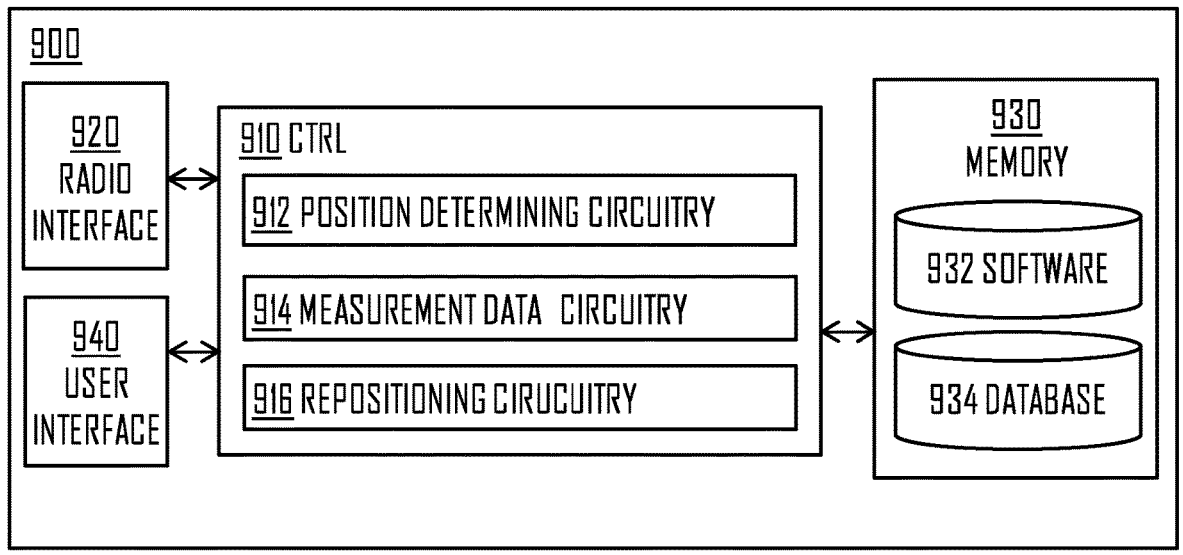

FIGS. 8 and 9 provide apparatuses 800, 900 comprising a control circuitry (CTRL) 810, 910, such as at least one processor, and at least one memory 830, 930 including a computer program code (software) 832, 932, wherein the at least one memory and the computer program code (software) 832, 932, are configured, with the at least one processor, to cause the respective apparatus 800, 900 to carry out any one of the embodiments of FIGS. 1 to 7B, or operations thereof.

Referring to FIGS. 8 and 9, the memory 830, 930, may be implemented using any suitable data storage technology, such as semiconductor based memory devices, flash memory, magnetic memory devices and systems, optical memory devices and systems, fixed memory and removable memory. The memory 830, 930 may comprise a database 834, 934 for storing data. For example, the first measurement data, second measurement data, at least one threshold value and/or computed difference value(s) may be stored in the database 834, 934.

The apparatus 800, 900 may further comprise radio interface (TRX) 820, 920 comprising hardware and/or software for realizing communication connectivity according to one or more communication protocols. The TRX may provide the apparatus with communication capabilities to access the radio access network, for example. The TRX may comprise standard well-known components such as an amplifier, filter, frequency-converter, (de) modulator, and encoder/decoder circuitries and one or more antennas. TRX may provide access to F1 and/or Xn interface, for example, and/or provide UL/DL communication capability. Further, TRX may provide D2D capability for UEs.

The apparatus 800, 900 may comprise user interface 840, 940 comprising, for example, at least one keypad, a microphone, a touch display, a display, a speaker, etc. The user interface 840, 940 may be used to control the respective apparatus by a user of the apparatus 800, 900.

In an embodiment, the apparatus 800 may be or be comprised in a UE, e.g. the UE performing the method described above (e.g. see FIG. 2). For example, the apparatus 800 may be or be comprised in the UE 100 or UE 102.

In an embodiment, the apparatus 900 may be or be comprised in a network node or network element, e.g. the network node performing the method described above (e.g. see FIG. 3). For example, the apparatus 900 may be or be comprised in the network node 104.

According to an embodiment, with reference to FIG. 8, the control circuitry 810 comprises a measurement data circuitry 812 configured at least to perform operations described with respect to block 202 of FIG. 2; a difference value circuitry 814 configured at least to perform operations described with respect to block 204 of FIG. 2; a comparing circuitry 816 configured at least to perform operations described with respect to block 206 of FIG. 2, and a repositioning request circuitry 818 configured at least to perform operations described with respect to block 208 of FIG. 2.

According to an embodiment, with reference to FIG. 9, the control circuitry 910 comprises a position determining circuitry 912 configured at least to perform operations described with respect to block 302 of FIG. 3, a measurement data circuitry 914 configured at least to perform operations described with respect to block 304 of FIG. 3, and a repositioning circuitry 916 configured at least to perform operations described with respect to block 306 of FIG. 3.

Referring again to FIG. 8, according to an embodiment, the apparatus 800 utilizes one or more sensors 892 for obtaining the sensor measurement data. The one or more sensors 892 may comprise, for example, a pedometer and/or a barometer. In some embodiments, the one or more sensors, or at least some of a plurality of sensors, are UE internal sensor(s). Hence, the one or more sensors 892 may be comprised in the apparatus 800.

In an embodiment, at least some of the functionalities of the apparatus 900 may be shared between two physically separate devices, forming one operational entity. Therefore, the apparatus 900 may be seen to depict the operational entity comprising one or more physically separate devices for executing at least some of the described processes. Thus, the apparatus 900 utilizing such shared architecture, may comprise a remote control unit (RCU), such as a host computer or a server computer, operatively coupled (e.g. via a wireless or wired network) to a remote radio head(s) (RRH), such as a TRP or TRPs, located in a base station or network node 104, for example. In an embodiment, at least some of the described processes may be performed by the RCU. In an embodiment, the execution of at least some of the described processes may be shared among the RRH and the RCU. For example, CU/DU split may utilize such shared architecture.

In an embodiment, the RCU may generate a virtual network through which the RCU communicates with the RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

According to an aspect there is provided a system comprising a plurality of apparatuses 800 and one or more apparatuses 900. In an embodiment, the system comprises at least two apparatuses 800 and at least one apparatus 900.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory (ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 1 to 7B may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 1 to 7B or operations thereof.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 1 to 7B, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g, procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 1 to 7B may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

What is claimed is:

1. A method for a user equipment (UE) of a wireless communication network, the method comprising:
    obtaining, at a reference time instant $t_0$, a first measurement data associated with a first position of the UE;
    obtaining, at a subsequent time instant $t_i$ that is later than $t_0$ with $t_i > t_0$, a second measurement data associated with a second position of the UE, wherein the first measurement data and the second measurement data obtained by performing measurements by the UE, and wherein the first measurement data and the second measurement data comprise:
        device-to-device (D2D) measurement data associated with a D2D communication link between the UE and a second UE, the D2D measurement data including an angle of arrival (AoA), an angle of departure (AoD), and a separation distance based on time of flight (ToF); and
        sensor measurement data obtained via internal sensors of the UE, the internal sensors comprising a pedometer, a barometer, and satellite positioning circuitry;
    receiving, from a network node of the wireless communication network, via radio resource control (RRC) signaling:
        a D2D repositioning threshold value associated with each of the AoA, the AoD, and the separation distance; and
        a sensor repositioning threshold value associated with each of the pedometer, barometer, and satellite circuitry measurements;
    computing a first difference value for each of an AoA, AoD, and separation distance based on ToF, each of the first difference values indicative of a difference between a corresponding D2D measurement value of the first measurement data and a corresponding D2D measurement value of the second measurement data;
    computing a second difference value for each of measurement of the pedometer, the barometer, and the satellite positioning circuitry, each second difference value indicative of a difference between a corresponding sensor measurement value of the first measurement data obtained at the time $t_0$ and a corresponding sensor measurement value of the second measurement data obtained at the time $t_i$;
    comparing the first difference value with a corresponding D2D repositioning threshold value and each of the second difference values with a corresponding sensor repositioning threshold value, wherein the D2D repositioning threshold value and the sensor repositioning threshold value are provided by the wireless communication network to the UE via radio resource control (RRC) signaling;
    determining the following: all of the first difference values exceed their respective D2D repositioning threshold values, and all of the second difference values exceed their respective sensor repositioning threshold values;
    based on the determining, triggering a transmission of a repositioning request to a network node of the wireless communication network, wherein the repositioning request initiates a positioning reference signal (PRS) transmission by the network node for relocalizing the UE.

2. A non-transitory computer-readable medium comprising computer program code encoded thereon, wherein the computer program code, when executed by a computer, causes the computer to carry out the method of claim 1.

3. An apparatus, comprising:
    at least one processor; and
    at least one memory storing instructions that, when executed on the processor, cause the apparatus to:
    obtain, at a reference time instant $t_0$, a first measurement data associated with a first position of the apparatus;
    obtain, at a subsequent time instant $t_i$ that is later than $t_0$ with $t_i > t_0$, a second measurement data associated with a second position of the apparatus, wherein the first measurement data and the second measurement data are obtained by performing measurements by the apparatus, and wherein the first and second measurement data comprise:
        device-to-device (D2D) measurement data associated with a D2D communication link between the UE and a second UE, the D2D measurement data including an angle of arrival (AoA), an angle of departure (AoD), and a separation distance based on time of flight (ToF); and
        sensor measurement data obtained via internal sensors of the UE, the internal sensors comprising a pedometer, a barometer, and satellite positioning circuitry;
    receiving, from a network node of the wireless communication network, via radio resource control (RRC) signaling:
        a D2D repositioning threshold value associated with each of the AoA, the AoD, and the separation distance; and
    a sensor repositioning threshold value associated with each of the pedometer, barometer, and satellite circuitry measurements;
    compute a first difference value for each of an AoA, AoD, and separation distance based on ToF, each of the first difference values indicative of a difference between a corresponding D2D measurement value of the first measurement data and a corresponding D2D measurement value of the second measurement data;

computing a second difference value for each of measurement of the pedometer, the barometer, and the satellite positioning circuitry, each second difference value indicative of a difference between a corresponding sensor measurement value of the first measurement data obtained at the time $t_0$ and a corresponding sensor measurement value of the second measurement data obtained at the time $t_i$;

compare the first difference value with a corresponding D2D repositioning threshold value and each of the second difference values with a corresponding sensor repositioning threshold value, wherein the D2D repositioning threshold value and the sensor repositioning threshold value are provided by the wireless communication network to the apparatus via radio resource control (RRC) signaling;

determining the following: all of the first difference values exceed their respective D2D repositioning threshold values, and all of the second difference values exceed their respective sensor repositioning threshold values;

based on the determining, trigger a transmission of a repositioning request to a network node of the wireless communication network, wherein the repositioning request initiates a positioning reference signal (PRS) transmission by the network node for relocalizing the apparatus.

4. The apparatus of claim 3, wherein the at least one memory and instructions are further configured, with the at least one processor, to cause the apparatus to:

transmit the first measurement data to the network node; and receive the at least one D2D repositioning threshold value from the network node, the at least one D2D repositioning threshold value being determined based on the transmitted first measurement data.

* * * * *